May 5, 1970 P. A. KANE 3,509,643

METHOD AND MEANS FOR SELF-TEACHING

Filed Feb. 24, 1967

PATRICK A. KANE
INVENTOR.

BY *Norman K. Bigg*

3,509,643
METHOD AND MEANS FOR SELF-TEACHING
Patrick A. Kane, Hartline, Wash. 99135
Filed Feb. 24, 1967, Ser. No. 618,484
Int. Cl. G09b 7/06
U.S. Cl. 35—9                                              8 Claims

ABSTRACT OF THE DISCLOSURE

A method and apparatus for self-teaching which totals every attempt to answer multiple choice type questions and simultaneously indicates categorically either right or wrong answers; the apparatus having a digital recorder and an electrical circuit including an indicator energized each time the said recorder is actuated but said circuit being open for one category of answers and closed for the other.

---

Figure 1:
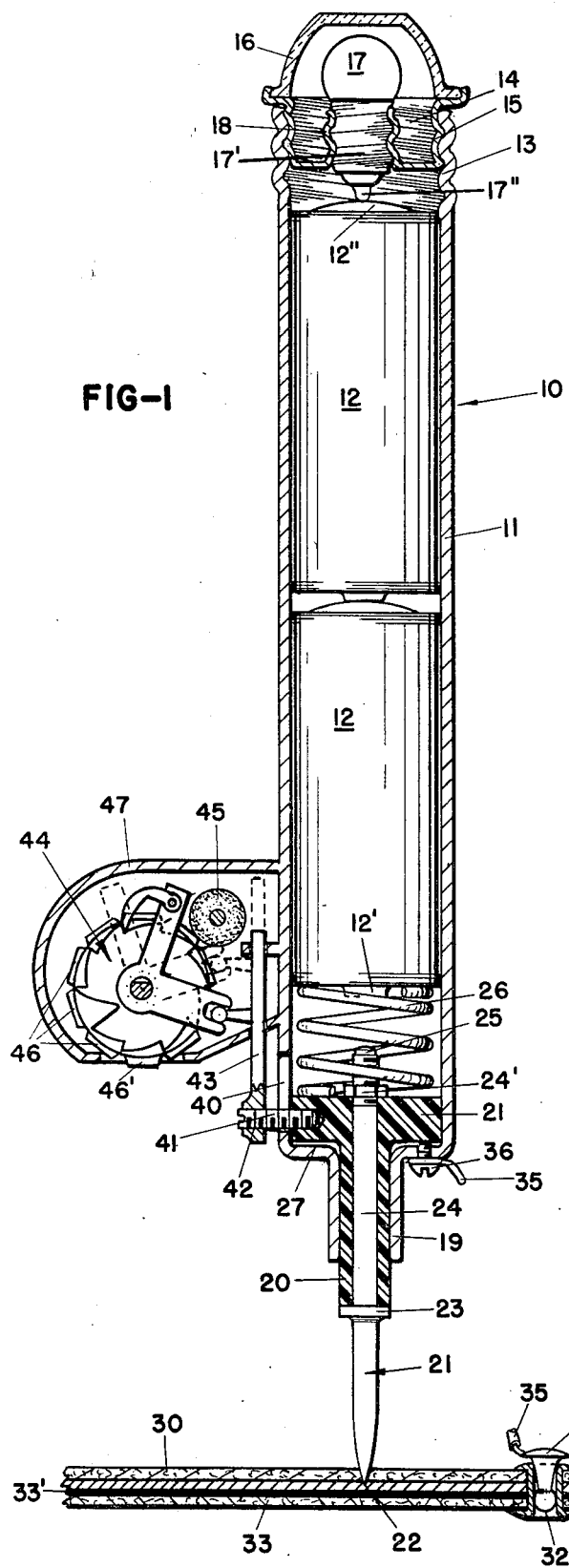

My present invention relates to teaching methods and devices which reduce the time required of an instructor and yet provides individual instruction more commensurate to the needs of each individual student, and is an improvement over my co-pending application, Ser. No. 607,802, filed Jan. 6, 1967, now Pat. No. 3,421,231, and entitled, "Electrokinetic Tutoring Means."

It is a principal object of the present invention to provide a method of self-teaching that obscures which one of a number of revealed answers is the correct answer until the student makes a choice and then promptly informs the student whether his choice of answer is correct or incorrect so that he may ponder each answer and learn by trial and error.

Another important object of the present invention lies in the provision of means for so teaching which comprises a hand-held stylus adapted for numerant recording each attempt to answer and also indicating momentarily whether the selected answer is correct or incorrect.

Yet another object of the present invention lies in the provision of a hand-held stylus including a body and telescopically associated outwardly biased spicule adapted to telescope during normal use which telescopic movement simultaneously actuates a digital recorder and electrical circuit means for indicating the answer as correct or incorrect.

A still further object of the present invention lies in the provision of a hand-held stylus having a unique composition of conductive and non-conductive parts arranged to provide mechanical operation of its digital recorder simultaneously with electrical functioning of its answer correctness indicating means.

Summarized briefly, the invention includes, in combination, a hand-held stylus having an outwardly biased yieldably telescopic spicule which, upon telescopic movement, closes a pair of contacts in an electrical circuit including in series a source of power and an indicator light bulb, and employs a printed circuit on an instruction sheet to complete the circuit when contacted by the spicule to indicate one category of answers, "correct" or "incorrect." It also has a mechanically operated digital recorder adapted to indicate in numerical progression the number of times the spicule is moved telescopically. The digital recorder is provided with embossed numbers and an inking device and the numbers protrude from the housing to permit stamping the cumulative total of the recorder on the instruction sheet.

Figure 2:
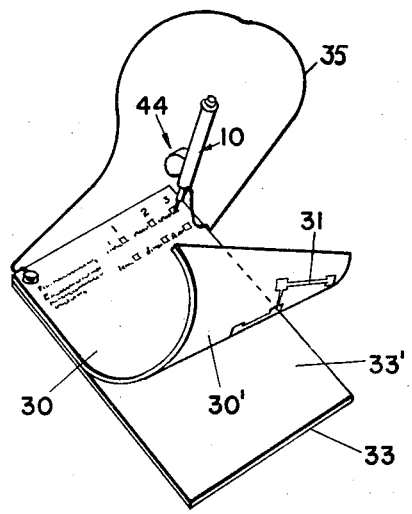

Other objects will appear from the following description, the claims appended thereto, and from the annexed drawings, in which like reference characters designate like parts throughout the views, and wherein:

FIGURE 1 is an enlarged sectional view of my improved stylus and a fragment of an instruction sheet; and FIGURE 2 is a perspective view, on a reduced scale, of a stylus and instruction sheet in associated relationship and showing the printed circuit on the back side of the instruction sheet.

In the drawings, I have shown that the stylus 10 is comprised of a body 11 which is formed of a conductive metal and is hollow to receive a source of electrical energy disclosed in the form of two "pen-lite" batteries 12—12. At its upper end the body 11 is provided with roll-formed threads at 13 which threadedly receive and electrically connect thereby to a cap 14 having mating threads at 15 and covered by a removable translucent or transparent cover 16 through which the glow from a light bulb 17 may be seen. The cap 14 is provided with a threaded sleeve 18 which threadedly receives and electrically connects the threaded base 17' of the bulb 17.

At its lower end the body 11 is reduced to provide a reduced diameter cylindrical sleeve 19 which constitutes a raceway for the reciprocal sleeve 20. An enlarged annular head 21 is formed integrally with said sleeve 20 from a dielectric material and thus not only effects relative reciprocal movement with respect to the body 11 but also receives the elongated spicule 21 of conductive material, for example, brass.

At its lower end the spicule 21 has an acuminate point 22 and spaced upwardly therefrom an annular flange 23 or other stop designed to limit insertion of the threaded upper end portion 24 into the dielectric sleeve 20. On its upper end, the spicule 21 has a contact point 25 which is disposed to contact the point 12' of the batteries 12 and thus constitute switching means 25–12' for an electrical circuit. The spicule is secured by clamping the dielectric sleeve between flange 23 and a nut 24'.

The opposed contact 12" is held in electrical contact with the centric contact 17" of the bulb 17 by means of an expansion spring 26 interposed the batteries 12 and the dielectric sleeve's head 21 and thus also biases the sleeve 20 and spicule outwardly of the body 11 to the limit permitted by the head 21 striking the body reduction at wall 27.

It can be seen thus far that downward pressure upon the stylus 10 will cause the spicule 21 to telescope into the body 11 until the contacts 25 and 12' physically and thus electrically contact each other. This pressure is sufficient to cause the acuminate point 22 to penetrate the instruction sheet 30 and contact electrically with the printed circuit 31 on the back side or lower face 30' of the instruction sheet 30. A metallic conductive rivet 32 passes through the instruction sheet 30 and electrically contacts the printed circuit and thence presses upon a pressure sensitive sheet 33 which may be impregnated with a chemical adapted to interact with a chemical on the lower face 30' of the instruction sheet 30 to leave a mark from stylus pressures thereon, or said pressure sensitive sheet may be adapted otherwise to produce a mark on face 30' as by means of the carbonized surface 33' of sheet 33.

A circuit completing flexible conductor 35 is connected to the body 11 as at 36 and its opposed end is removably connected to the rivet 32 as by a friction plug 37 of conductive material.

From the foregoing description it is obvious that each time the stylus 11 is thrust onto the instruction sheet 30, a mark will be applied to the back face 30' and coincidentally when the point 22 contacts the printed circuit and the points 25 and 12' contact each other the bulb 17 will be energized and its glow will be visible through the cap 16.

An axially elongated slot 40 is formed through the wall of the body 11 and a pin 41 is threadedly fixed in the sleeve's head 21 by passing inwardly through a threaded bore 42 of a push-rod 43, thence freely through said slot 40 and into the head 21.

At its upper end the push-rod 43 is adapted to actuate a digital recorder 44 in one of the many now well-known manners, to cause each telescopic movement of the spicule 21 to advance the recorder 44 one digit.

The recorder is provided with an ink supply roller 45 which contacts the faces of the embossed numbers, as indicated by numeral 46 and these faces protrude beyond the housing 47 as seen at 46' so that the cumulative number may be stamped on the instruction sheet 30 when the work is completed.

Conventional means (not shown) are provided to reset the digital recorder to "zero" after the grade is stamped on the paper.

In practice, the student is provided with an instruction sheet 30 having printed thereon a number, say 25, of questions and multiple choice answers, for example three answers for each question. By reading the questions and answers the student ponders the correct answer and utilizing the stylus 11 connected as at 32–37 marks the appropriate area by drawing a line and then pushing down on the stylus as far as it will readily telescope. This will mark the back of the sheet 30 and actuate the digital recorder 44 and simultaneously light the bulb 17 if the point 22 perforates the sheet at a point where the printed circuit is superposed thereby. If the sheet 30 is printed to indicate incorrect answers by energizing the bulb 17, the student reads again the answers and makes his next choice, thus learning promptly where he was in error and the correct answer. Upon completion of the drill, the digital recorder has totaled the number of attempts required to get 25 correct answers out of 75 correct and incorrect total possible attempts. This provides the student with a mathematical equation for determining how well informed he was at the beginning of the exercise, and eliminates the necessity for an instructor to spend time correcting and grading the papers. The student thus learns by the psychologically proven method of rewarded trial and error and also repetition by re-reading the questions and answers immediately.

Having thus described my invention, I claim as new and desire to secure by Letters Patent of the United States, the following:

1. Teaching means for use with a penetrable sheet having an electrical conductor and an electrically conductive means connected to said conductor comprising:
  a slender pen-like electrically conductive body electrically connected in an electrical circuit including said electrical conductor and electrically conductive means;
  an electrically conductive pointed spicule carried by and biased outwardly of said body for axial pressure-sensitive telescopic movement relative thereto and insulated therefrom electrically;
  a digital recorder means interconnected to advance said digital recorder one digit upon each telescopic movement of said spicule; and
  said electrical circuit comprising said electrically conductive means, said body and spicule, a light bulb, a source of electrical energy and switching means for energizing said light bulb upon telescopic movement of said spicule when said spicule contacts said electrical conductor.

2. The invention in accordance with claim 1 and further characterized by:
  said body carrying and electrically connected to one terminal of said indicator light bulb; and
  said switching means comprising a pair of contacts, one carried by and electrically connected to said spicule and actuable by telescopic movement of said spicule to make connection therebetween.

3. The invention in accordance with claim 2 and further characterized by:
  said electrical circuit including as a part thereof an instruction sheet having a printed electrical circuit on the back side thereof.

4. The invention in accordance with claim 3 and further characterized by:
  said instruction sheet overlying a pressure-sensitive sheet adapted to mark the back side of said instruction sheet when pressure is applied by said spicule.

5. The invention in accordance with claim 1 and further characterized by:
  said source of electrical energy being interposed between said light bulb and said spicule within said body;
  resilient means yieldably biasing said spicule outwardly of said body and effecting yieldable opening of said switching means; and
  said electrical circuit including an instruction sheet having a printed circuit electrically connected by said conductive means to said body;
  whereby pressure effective to telescope said spicule into said body will effect simultaneous actuation of said digital recorder and said switching means.

6. The invention in accordance with claim 5 and further characterized by:
  said printed circuit being on the back side of said instruction sheet; and
  said spicule point being sufficiently acuminate to effect penetration of said instruction sheet to contact said printed circuit by said pressure effective to telescope said spicule into said body.

7. Means for use with an answer sheet having correct and incorrect answers, for teaching, comprising:
  a slender hand-held pen-like body having a reciprocative spicule;
  a digital recorder;
  a visual indicator;
  means operable to actuate said digital recorder each time said spicule is manually motivated to indicate an answer and thereby total the number of attempts to answer;
  means operable to actuate said visual indicator each time said spicule is manually motivated to indicate an answer in one category selected from correct and incorrect; and means for printing by the digital recorder its total on said sheet.

8. Means for teaching, comprising:
  a slender pen-like body adapted to be hand-held and manipulated;
  a spicule carried by and biased outwardly of said body for pressure-sensitive axial telescopic movement relative thereto;
  a digital recorder on said body having its digits exposed;
  means interconnected to advance said digital recorder one digit upon each telescopic movement of said spicule;
  an electrical circuit comprising a light bulb, a source of electrical energy and switching means for energizing said light bulb upon telescopic movement of said spicule when said spicule completes said electrical circuit; and means effective to print the exposed digits upon a surface applied thereto.

References Cited

UNITED STATES PATENTS

| | | | |
|---|---|---|---|
| 2,165,613 | 7/1939 | Conn | 35—48 |
| 2,511,202 | 6/1950 | Fulboam | 35—48 |
| 2,546,666 | 3/1951 | Fleischer | 35—9 |
| 2,889,634 | 6/1959 | Bringmann | 35—9 |
| 2,970,385 | 2/1961 | Bringmann | 35—9 |
| 3,057,082 | 10/1962 | Wellington et al. | 35—48 |
| 3,086,300 | 4/1963 | Rugland et al. | 35—9 |
| 3,100,352 | 8/1963 | Boissevain | 35—9 |
| 3,177,595 | 4/1965 | Yonker et al. | 35—48 |
| 3,316,660 | 5/1967 | Greenspan | 35—9 |
| 3,397,466 | 8/1968 | Stillit | 35—9 |
| 3,300,876 | 1/1967 | Johannsen | 35—48 |

FOREIGN PATENTS 750,625  1/1967  Canada.

EUGENE R. CAPOZIO, Primary Examiner

W. H. GRIEB, Assistant Examiner